(12) United States Patent
Smith

(10) Patent No.: US 6,523,641 B2
(45) Date of Patent: Feb. 25, 2003

(54) TRAILER MOUNTED, RETRACTABLE ELEVATED HUNTING STAND

(76) Inventor: Richard D. Smith, P.O. Box 468, Eunice, LA (US) 70535

( * ) Notice: Subject to any disclaimer, the term of this patent is extended or adjusted under 35 U.S.C. 154(b) by 0 days.

(21) Appl. No.: 09/843,371

(22) Filed: Apr. 26, 2001

(65) Prior Publication Data

US 2002/0157899 A1 Oct. 31, 2002

(51) Int. Cl.⁷ .................................................. E06C 5/00
(52) U.S. Cl. ..................................... 182/63.1; 182/127
(58) Field of Search .............................. 182/63.1, 69.4, 182/69.6, 127

(56) References Cited

U.S. PATENT DOCUMENTS

| | | |
|---|---|---|
| 221,401 A | 11/1879 | Drake et al. |
| 1,362,944 A | * 12/1920 | Kirby ........................... 182/145 |
| 2,732,118 A | * 1/1956 | Reinhardt ..................... 182/113 |
| 3,882,964 A | 5/1975 | Schellenberg |
| 4,696,374 A | 9/1987 | Hale |
| 4,800,986 A | 1/1989 | Hayes |
| 5,295,555 A | 3/1994 | Strange |
| 5,409,081 A | 4/1995 | Reeves |
| 5,564,523 A | 10/1996 | Howard |
| 5,881,839 A | * 3/1999 | Stanley ........................ 182/115 |

* cited by examiner

*Primary Examiner*—Alvin Chin-Shue
(74) *Attorney, Agent, or Firm*—Jesse D. Lambert (57) ABSTRACT

A trailer-mounted, retractable elevated hunting stand, especially but not exclusively suitable for deer hunting. The stand comprises a wheeled trailer, suitable for pulling behind a tow vehicle. The elevated stand is hingedly mounted on the trailer in a "jack-knife" configuration, with a main shaft mounted via a hinge to the trailer, and a platform atop the shaft. The platform is hinged to permit rotation for compact storage. A spring biases the shaft toward a vertical position. To use the stand, the shaft is rotated to the vertical position and the seating platform is rotated on its shaft mounting so as to be substantially horizontal when the shaft is vertical. The shaft is then locked in place. A ladder permits access to the elevated platform. The shaft telescopes for additional height if desired. The trailer permits hauling of an ATV when the stand is retracted.

10 Claims, 10 Drawing Sheets

TRAILER MOUNTED, RETRACTABLE ELEVATED HUNTING STAND

BACKGROUND—FIELD OF THE INVENTION

This invention relates to apparatus used in various outdoor sports, especially but not exclusively hunting. In particular, the present invention is a trailer mounted, retractable elevated hunting or viewing stand.

BACKGROUND—DESCRIPTION OF RELATED ART

This invention relates to a type of elevated seating platform, commonly referred to as a "blind" or "stand," which are commonly used by outdoors enthusiasts to view wildlife, such as birds and mammals. Stands are perhaps most commonly (but not exclusively) used by hunters, but birdwatchers and the like also employ stands. For the illustrative purposes of this patent application, the focus will be on the use of this stand for hunting. Further, while this invention is suitable for hunting various types of wild game, again for illustrative purposes it will be discussed in the context of hunting deer.

For various reasons, it is often desired to hunt deer from an elevated position, hence the reference to a "stand." Elevated stands are often more effective than ground-level stands, for several reasons: the increased height provides better viewing of the surroundings, permitting the hunter to see over and through underbrush; reduced chances of being viewed by the deer, since deer are not as apt to look upwardly for danger, as most of their natural predators are ground-bearing creatures; and the hunter's scent is not as likely to be detected by a deer when the hunter is elevated, being instead dispersed above a deer's scenting location.

Elevated stands are often constructed in place and are relatively permanent—that is, they cannot be readily moved to different areas. Many stands comprise "towers" which have a shooting platform atop a steel or wooden tower framework, placing the shooting platform some distance above the ground. The shooting platform typically provides a few square feet of area to stand on, in addition to a seat (preferably a swivel seat) and a surrounding rail which provides a safety measure and a rest for the hunter's rifle. The shooting platform may be partially or fully enclosed to shelter the hunter from the elements. Other "permanent" stands are built into trees.

A key limitation to permanent stands is just that—their permanence. Should a permanent stand be built in a non-productive area, or should game animals' habits change, the stand may be of little value. It is therefore desirable to have a stand which provides the benefits of a stable, elevated shooting platform, yet which can be readily moved to different locations to increase hunting effectiveness.

Various attempts have been made at building movable, elevated stands. Some movable stands have been built which comprise a conventional tower stand mounted on wheels, and therefore moveable at low speeds where sufficient overhead clearance exists, but stability problems with a tall structure exist. Obviously, such arrangements are not conducive to high-speed movement on public roads, due to both overhead clearance and stability concerns. Similar arrangements have included a scaffold-like structure mounted on a wheeled trailer, for example Howard, U.S. Pat. No. 5,564,523. Other stand configurations mount an elevated stand structure on an ATV, some of which are hingedly mounted on the ATV and capable of being carried from spot to spot on the ATV. Examples include Reeves, U.S. Pat. No. 5,409,081; Hayes III, U.S. Pat. No. 4,800,986; and Hale, U.S. Pat. No. 4,696,374. Stanley, U.S. Pat. No. 5,881,839 discloses a collapsible stand mounted in the bed of a pickup truck.

Strange, U.S. Pat. No. 5,295,555 does disclose a trailer mounted, hingedly fixed hunting stand, which appears to be adapted to carry an ATV on the trailer (with the trailer in turn adapted to be towed either by a car or truck on a roadway, or by the ATV upon location). However, the apparatus disclosed in Strange is a relatively complex one, comprising hydraulic cylinders to raise and lower the stand, of necessity requiring a battery, electric motor and hydraulic pump assembly to power the hydraulic cylinders. By contrast, the present invention comprises a trailer mounted "jack-knife" stand assembly, of a simplified and relatively inexpensive design, in a preferred embodiment using only a spring to assist in raising the main shaft on which the shooting platform mounts.

DESCRIPTION OF THE PREFERRED EMBODIMENT

The present invention may be made in a number of different embodiments, but for purposes of illustration one of the presently preferred embodiments is described herein. While the invention is described herein as applicable to hunting, especially deer hunting, the invention is equally suitable to any application wherein an elevated viewing position or platform is desired. Other uses for the invention include wildlife viewing, bird watching, surveying, spectator sport (football, baseball, etc.) viewing and photography. The scope of the invention is not to be limited by the exemplary embodiment and description presented herein.

Figure 1:
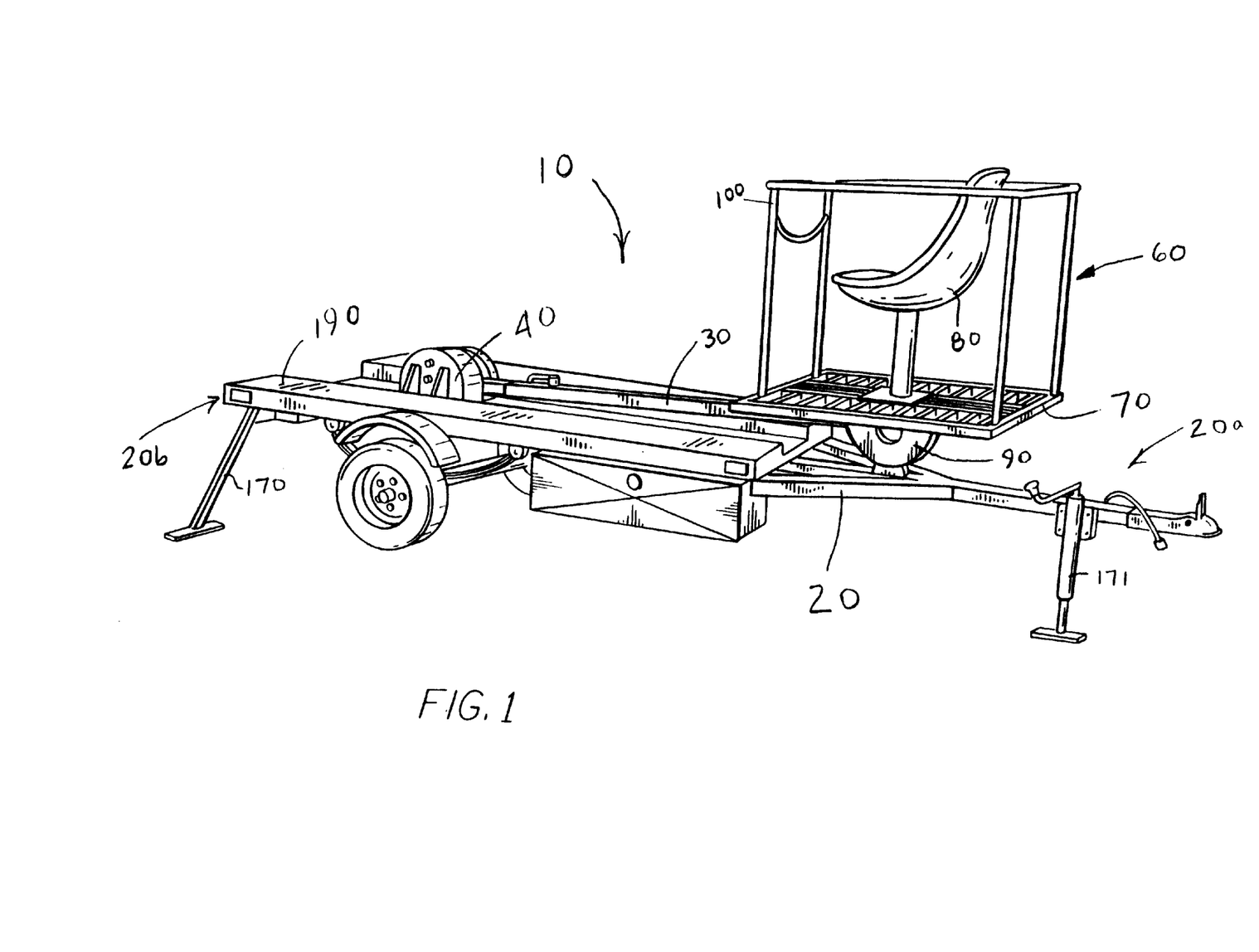
FIG. 1 is a perspective view of the stand, in a lowered position.
Figure 1A:
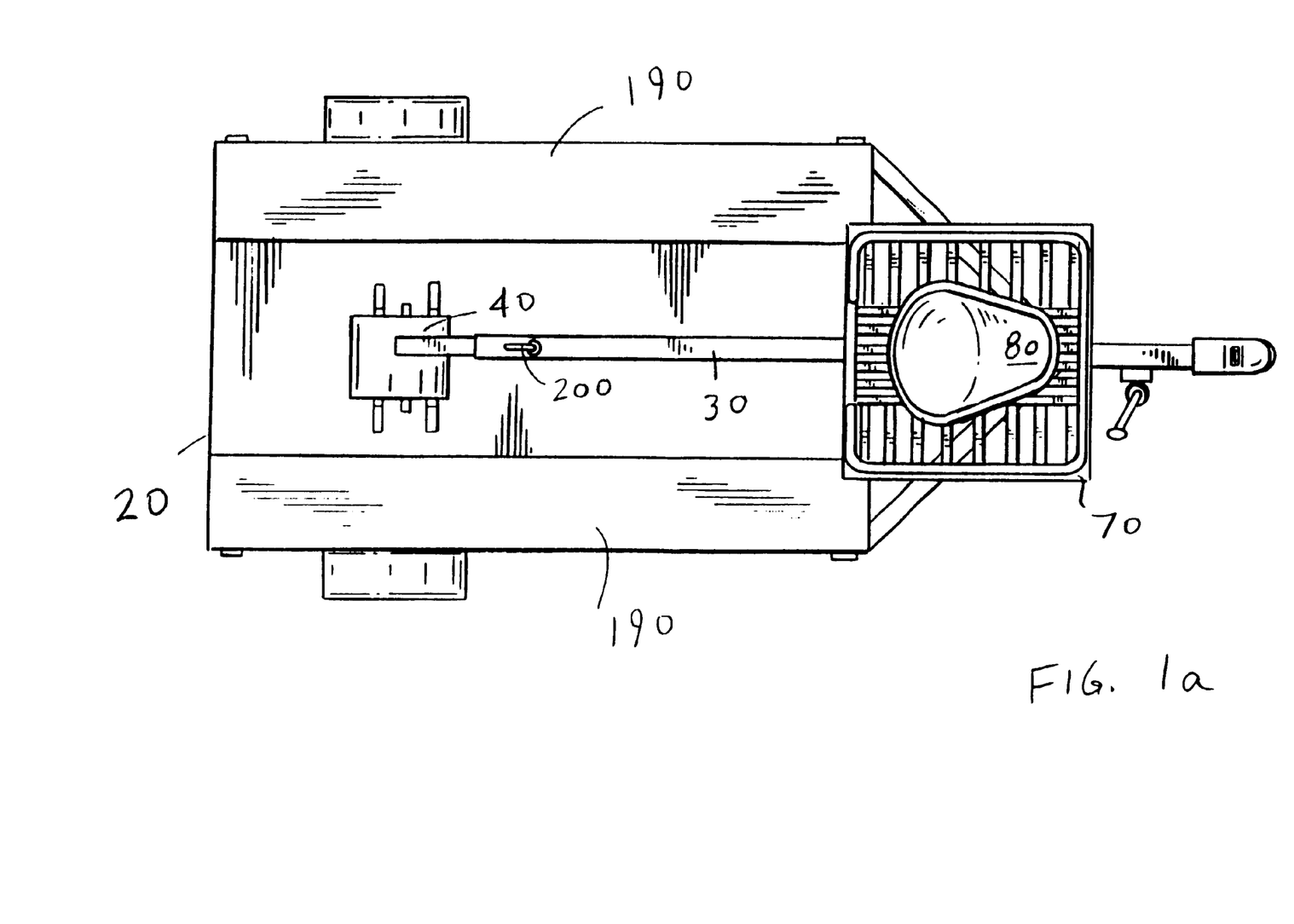
FIG. 1a is a top view of the stand in the position of FIG. 1.
Figure 2:
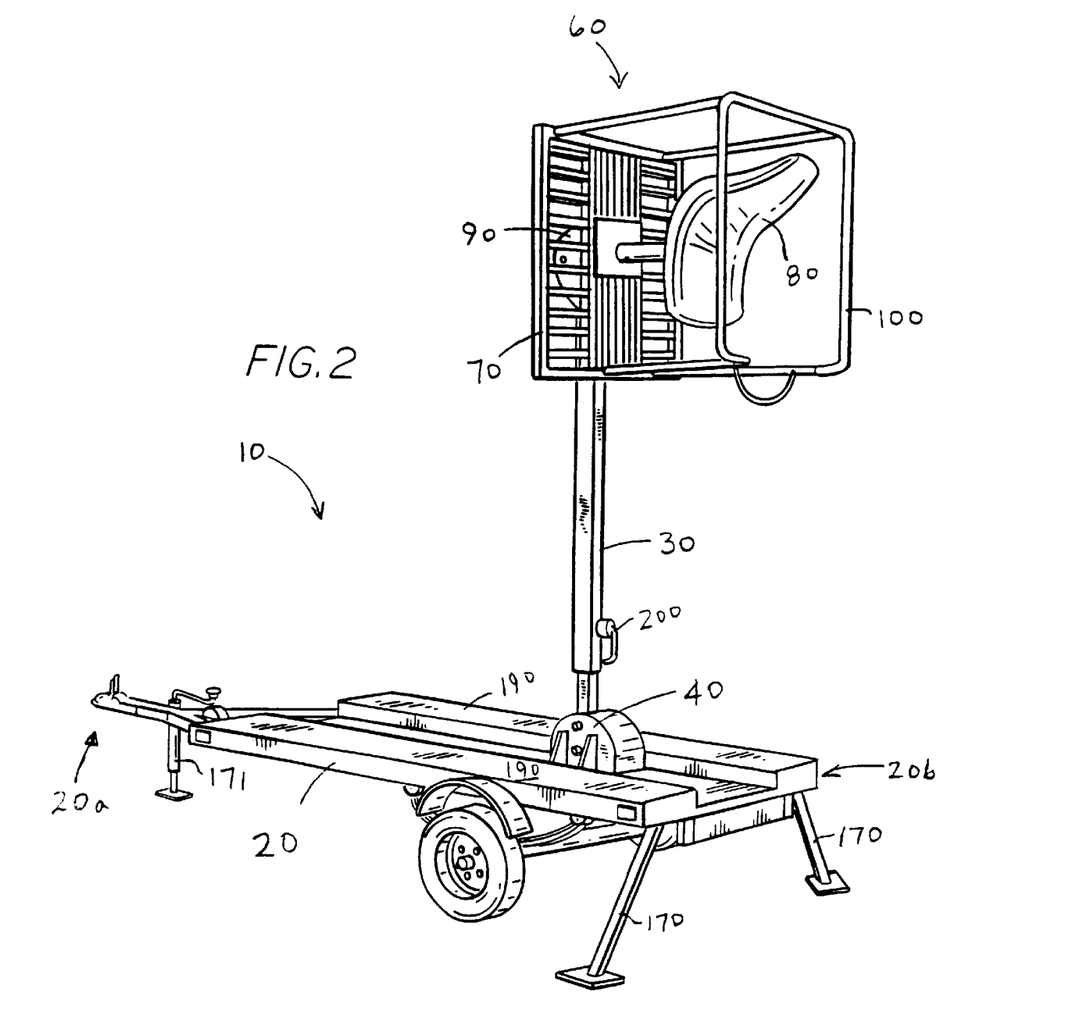
FIG. 2 is a perspective view of the stand, with the main shaft raised to its vertical position but before the shooting platform is rotated to its operational position.
Figure 3:
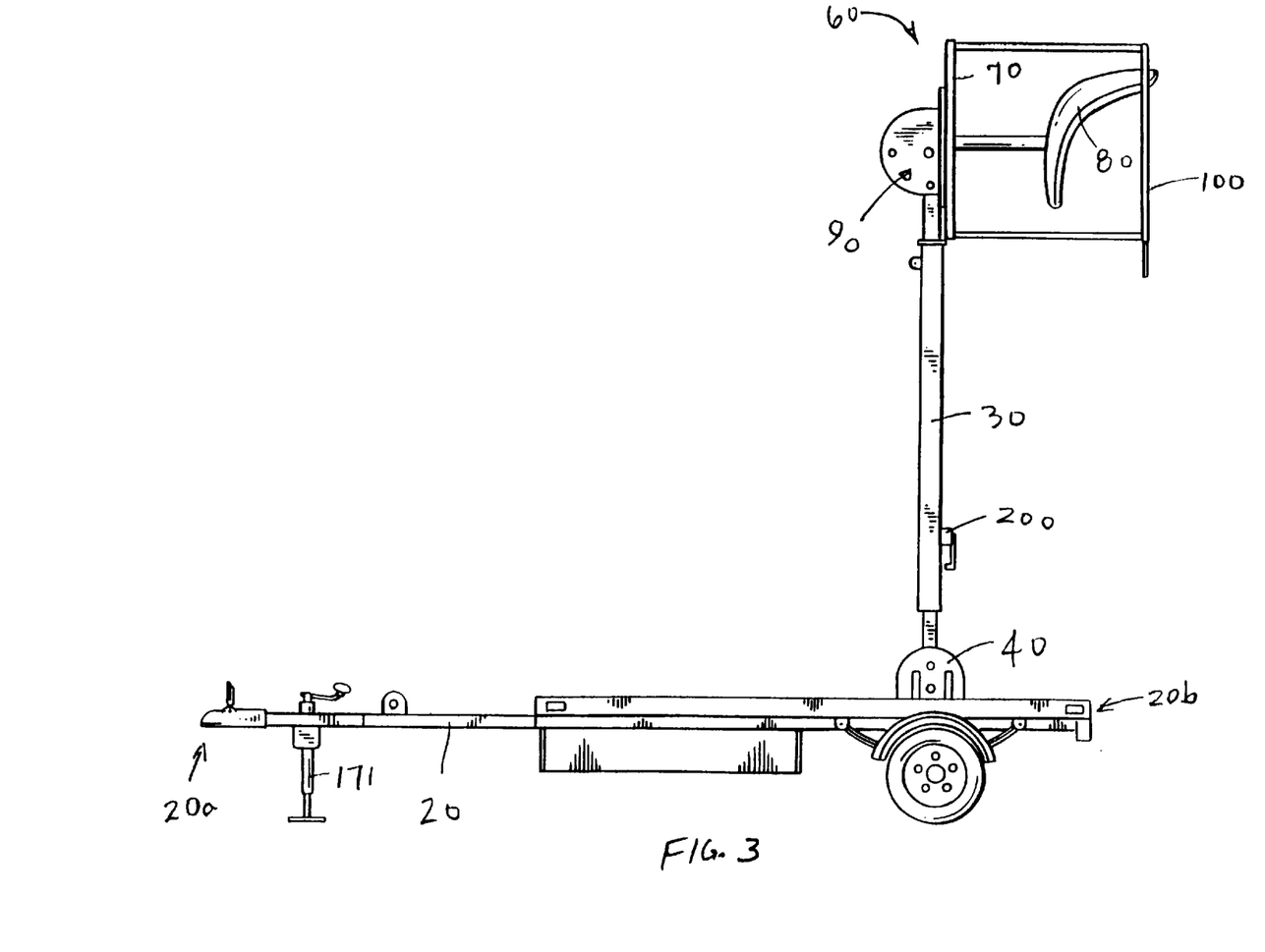
FIG. 3 is a side view of the stand in the position of FIG. 2.

FIGS. 1, 2 and 3 show various views of the stand 10. Referring first to those figures, stand 10 comprises a wheeled trailer 20 having a front end generally designated by 20a and a rear end generally designated by 20b. Wheeled trailer 20 is adapted to be towed by a tow vehicle, in a preferred embodiment comprising a trailer hitch connector mounted on front end 20a, as seen in FIG. 1. Main shaft 30 is shown in a first or folded down position. A first end of main shaft 30 is connected to trailer 20 by a hinge 40, to permit rotation of main shaft 30 between the first position and a second, substantially upright position, as will be shown in the drawings.

Stabilizer arms 170 extend from the trailer to a ground footing, to provide additional stability for the stand 10. A jack 171 supports front end 20a of trailer 20 at a desired elevation. It is understood that although a multi-positional jack is shown, fixed means of support are also suitable.

Figure 4:
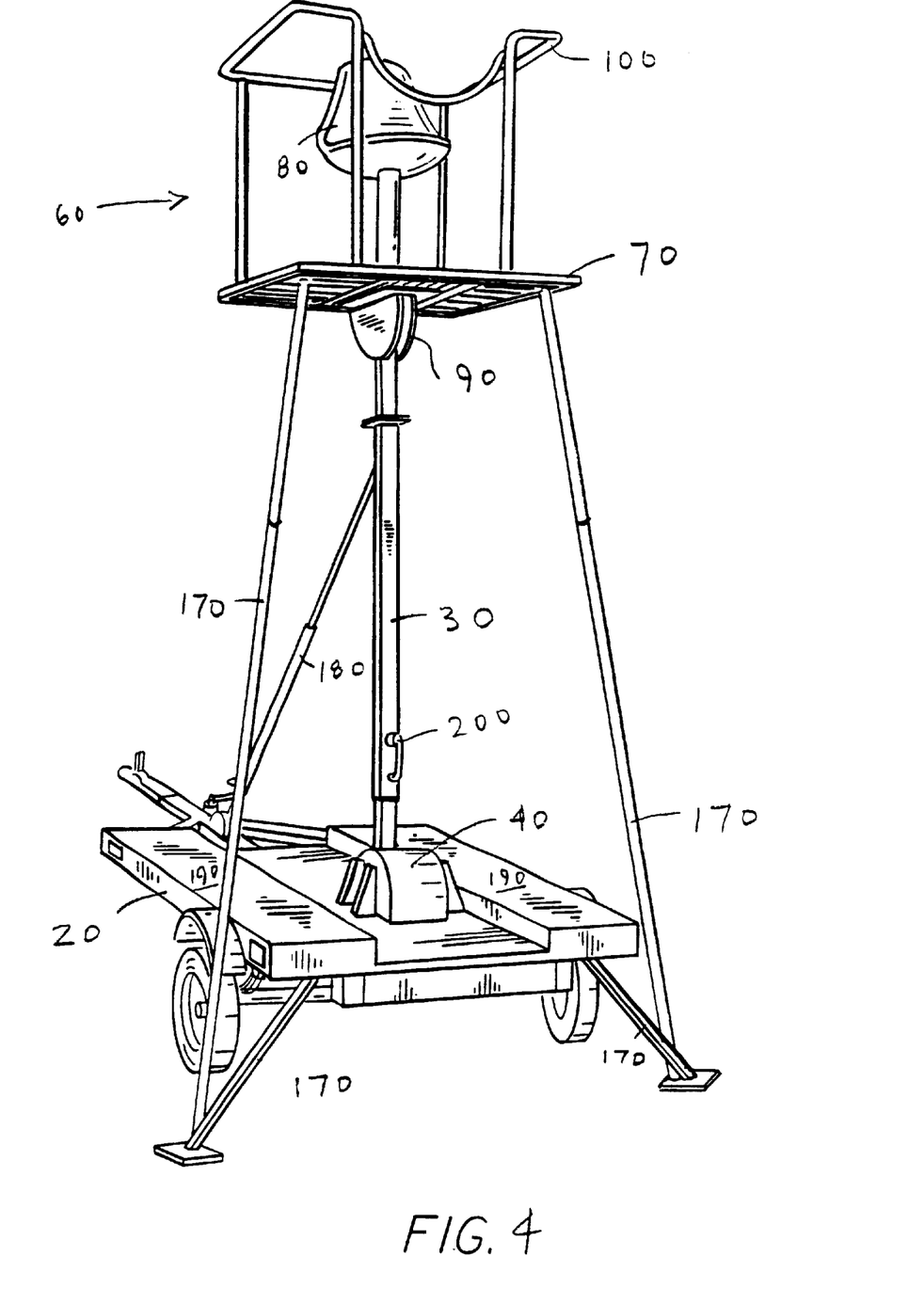
FIG. 4 shows one view of the stand, fully erected, but without the access ladder in place, for clarity.
Figure 5:
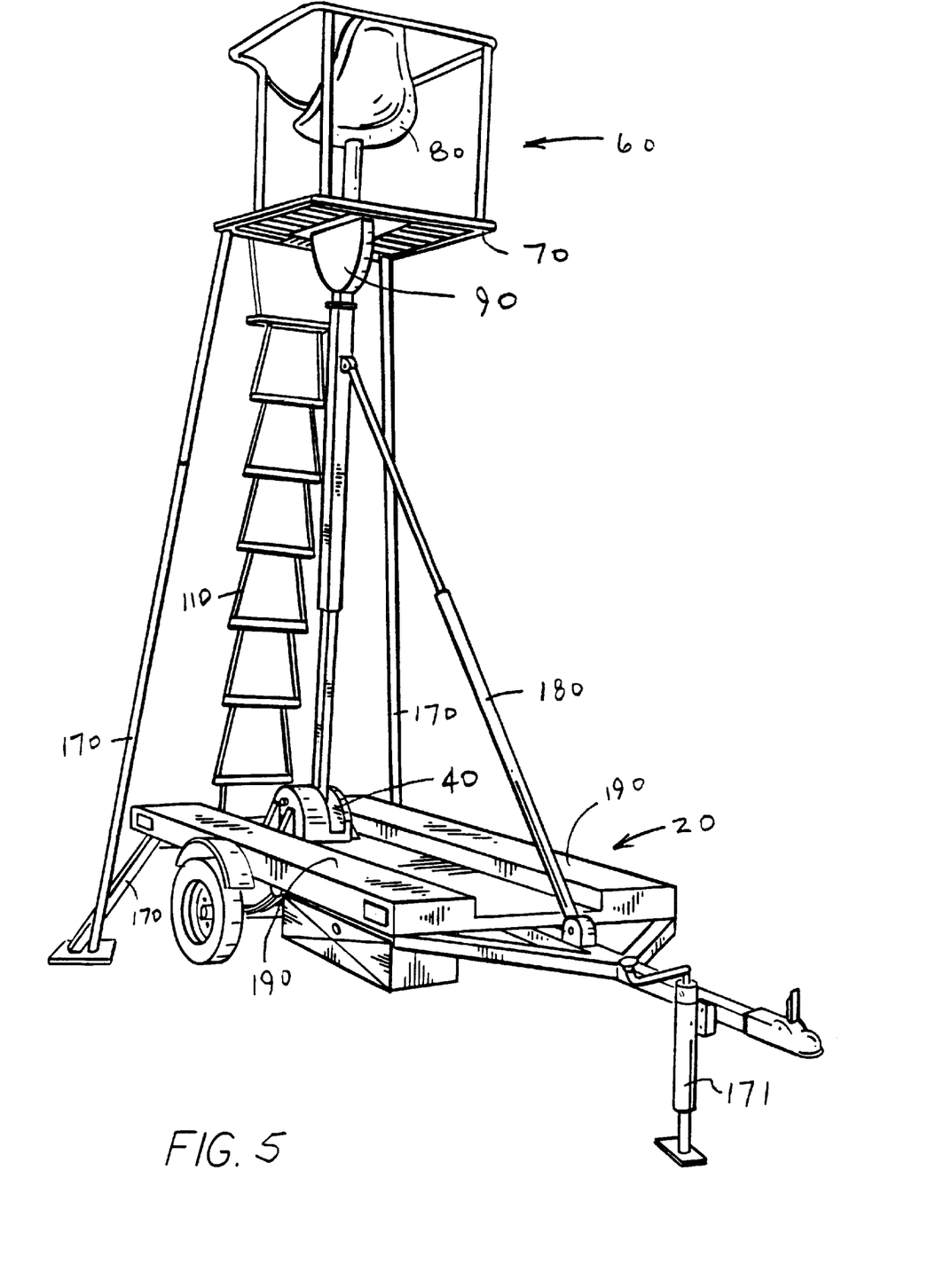
FIG. 5 is a view from another angle of the fully erected stand, showing the access ladder.

As can be seen, a platform 60 is mounted at a second end of main shaft 30. Platform 60 comprises a base 70 on which a user of the stand can stand upon. In the preferred embodiment, platform 60 further comprises a seat 80 for the hunter's use, and a rail 100 elevated from base 70 and surrounding at least a part of the circumference of base 70. Rail 100 is obviously an important safety aspect of the invention. Platform 60 is mounted to main shaft 30 by a hinge 90 which permits platform 60 to rotate between a first position as seen in FIGS. 1–3, where base 70 is generally aligned with main shaft 30, to a second position as shown in FIGS. 4 and 5 where base 70 is generally perpendicular to main shaft 30 and the stand is ready for use by a hunter or other user. Hinge 90 further comprises a lock, to lock platform 60 in the position shown in FIGS. 4 and 5 (when in use), described in more detail hereinafter.

FIGS. 4 and 5 show the invention in the erected position. Main shaft 30 is rotated to a second, substantially vertical position, via hinge 40. A lock is engaged to lock main shaft in that position. The lock may be a pin and hole arrangement, as specified with more detail in FIG. 9 and in the text hereinafter. Stabilizer arms 170, which may be telescopic, extend from trailer 20 to the ground, and from platform 60 (preferably from base 70) to the ground. In the preferred embodiment, a brace 180 extends from main shaft 30 diagonally to a connection on trailer 20, to brace main shaft 30 and provide a rigid, triangular structure formed by main shaft 30, trailer 20, and brace 180. The user of the stand may access platform 60 by ladder 110. While FIG. 5 shows a rope ladder, it is to be understood that the ladder of the present invention is not to be restricted to a rope ladder but includes rigid type ladders made of materials such as metal or wood.

Figure 6:
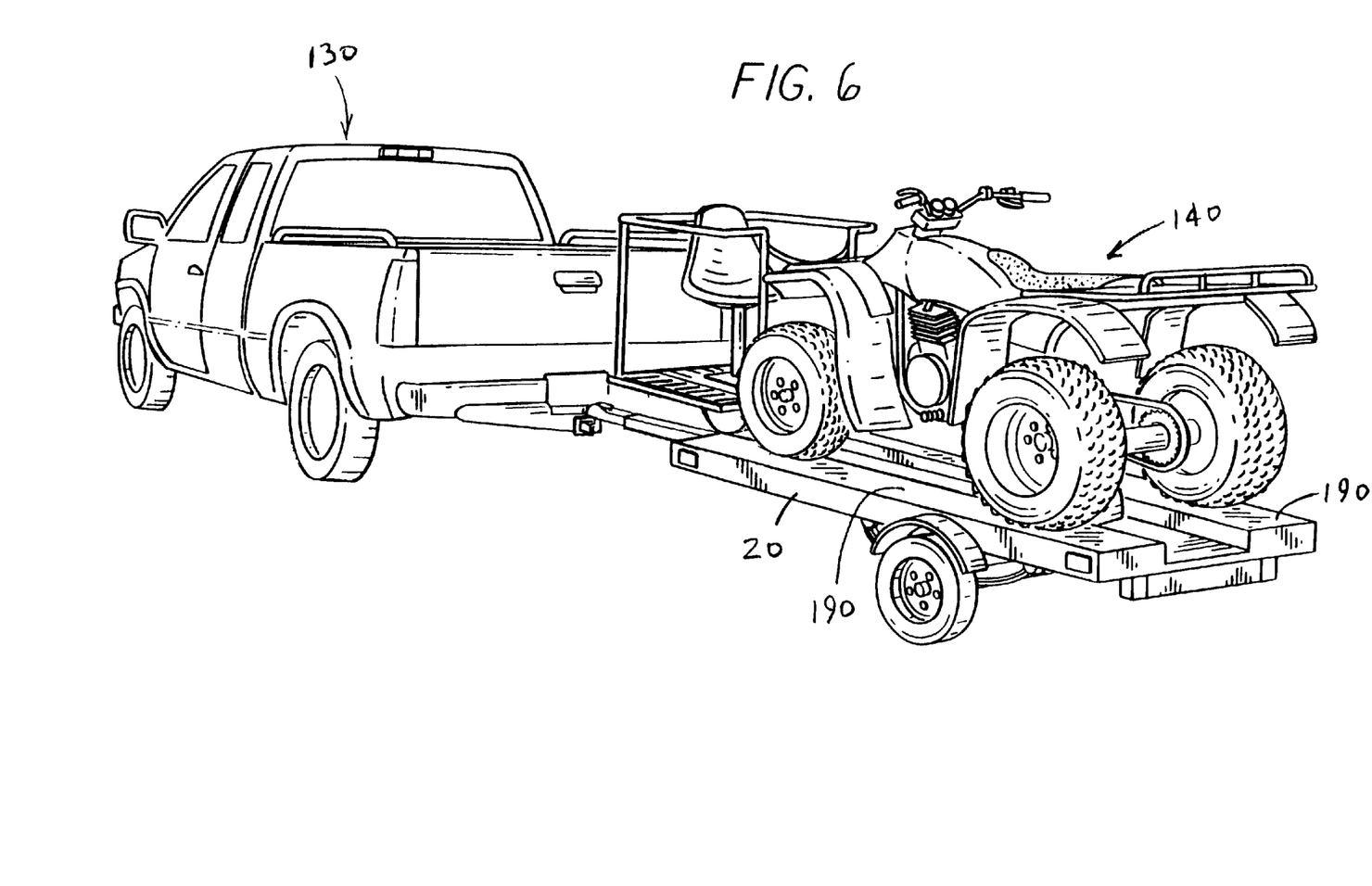
FIG. 6 shows the stand in a lowered position, attached to a pickup truck as a tow vehicle, and with an ATV (or "four wheeler") driven onto the trailer for transport.

FIG. 6 shows a key aspect of stand 10 of the present invention. In FIG. 6, trailer 20 is connected to a tow vehicle 130 (which may be a conventional pickup truck, or automobile), preferably by a conventional trailer hitch/ball mechanism. Main shaft 30 is rotated down to its second stored position (as previously seen in FIG. 1). Platform 60 is rotated to its stored position as previously seen in FIGS. 1, 2, and 3. An all terrain vehicle ("ATV") 140, often called a "four-wheeler," can be driven onto trailer 20, preferably via ramps (not shown). A surface is provided on trailer 20 for holding ATV 140. In the preferred embodiment, the surface comprises at least two tracks 190, preferably with a non-skid surface thereon. In the preferred embodiment, as seen in FIG. 6, a typical four wheeler will straddle main shaft 30 providing an efficient loading arrangement.

Figure 7:
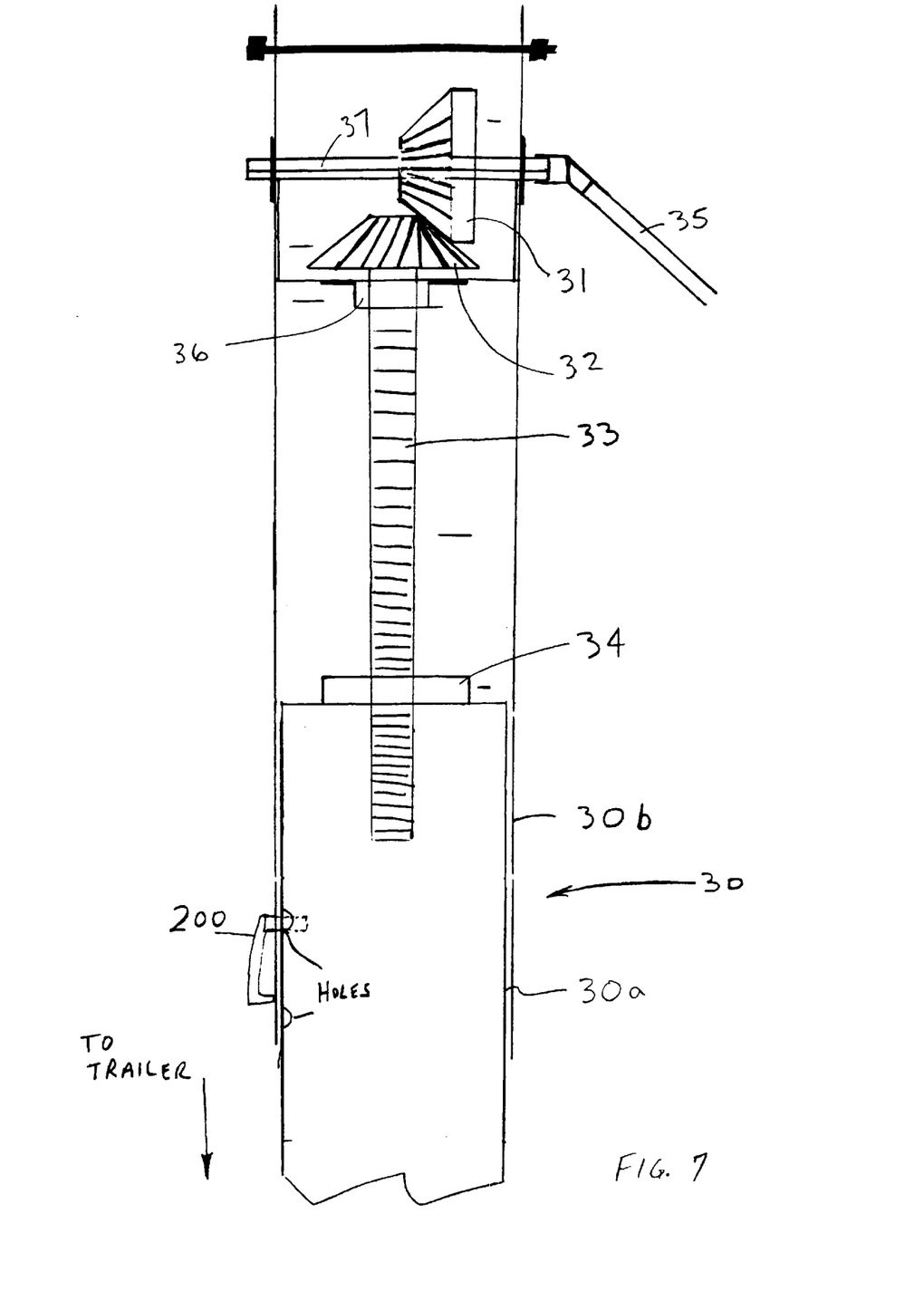
FIG. 7 is a view in cross section of the gear mechanism which enables telescoping of the main shaft.

Also, in the preferred embodiment, main shaft 30 is mounted via hinge 40 at a position closer to rear end 20b of trailer 20, than it is to front end 20a; mounted in such manner, main shaft 30, from its second substantially vertical position as shown in FIGS. 2, 3, 4, and 5, rotates to its first folded position in a direction toward front end 20a of trailer 20. That position places platform 60 in a position nearer front end 20a than rear end 20b as shown in FIGS. 1, 6, and 7, and provides adequate space on trailer 20 for loading of ATV 140.

Figure 8A:
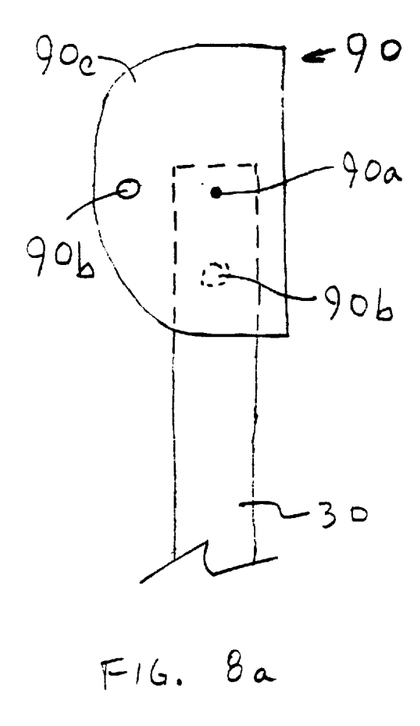
FIGS. 8a and 8b are views in more detail of a hinge and lock for the platform of the present invention.
Figure 8B:
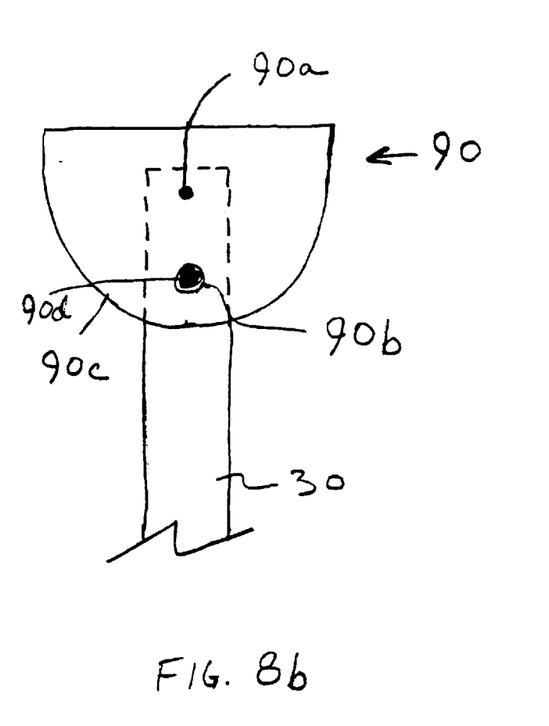

FIGS. 8a and 8b show hinge 90 in further detail. As described above, hinge 90 connects platform 60 to the second end of main shaft 30, to permit rotation of platform 60 between two positions (one for transit of the stand, one for use). Hinge 90 comprises a hinge plate 90c and a pin 90a which provides the connection to main shaft 30. Hinge 90 also comprises a lock, comprising holes 90b through hinge plate 90c and main shaft 30, and a pin 90d. When hinge is rotated to the position shown in FIG. 8b, pin 90d can be inserted through holes 90b, thereby locking platform 60 in place.

Figure 9:
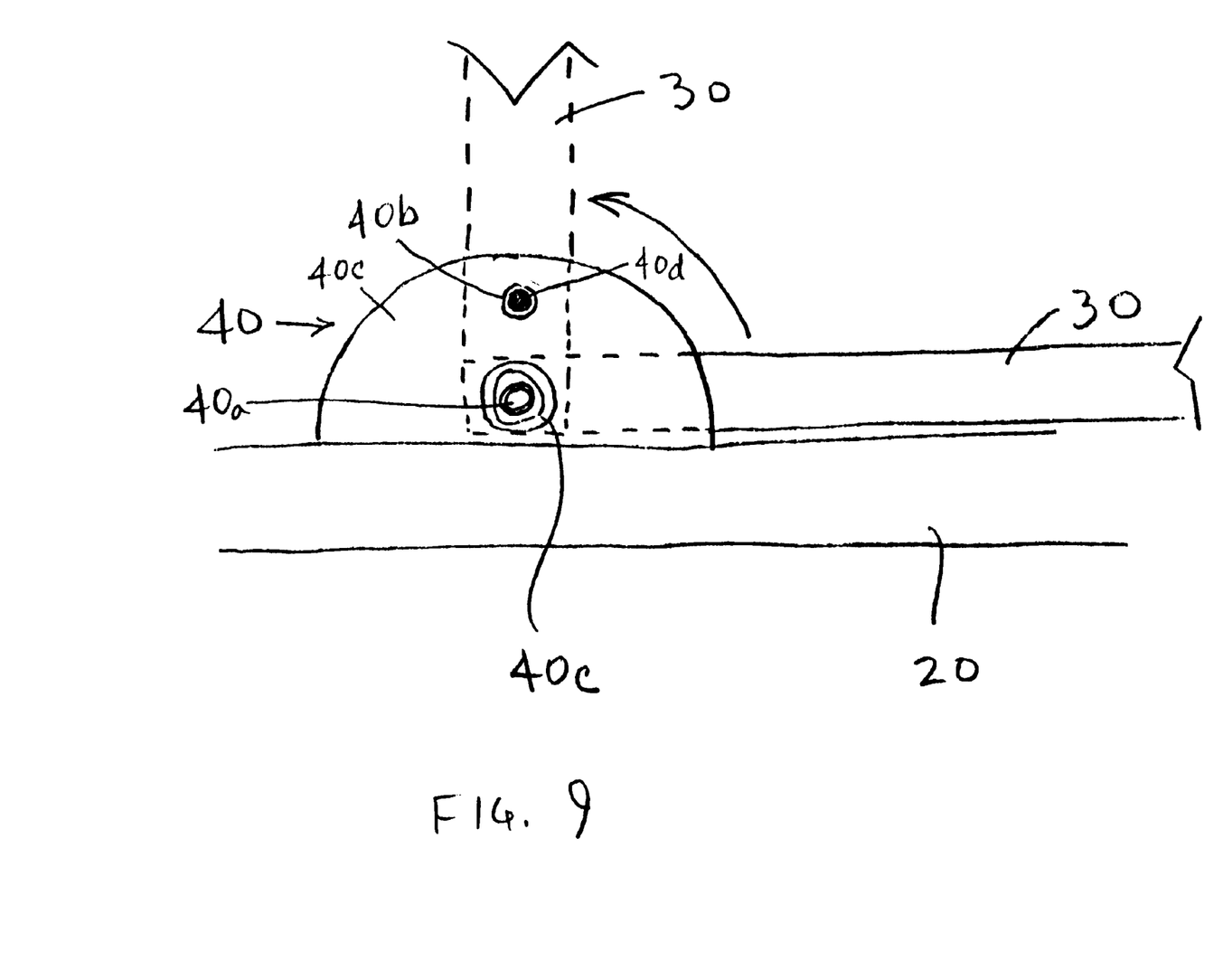
FIG. 9 is a view in more detail of the hinge, lock and spring, hingedly connecting the main shaft to the trailer.

A similar hinge 40 permits rotation of main shaft 30 on trailer 20. FIG. 9 shows main shaft 30 its first, lowered position, then rotated to its second, substantially vertical position (main shaft 30 shown in dotted lines). Hinge 40 comprises hinge plate 40c, and hinge pin 40a. Hinge 40 also comprises a lock, which in the preferred embodiment comprises a pin 40d inserted through holes 40b through hinge plate 40c and main shaft 30, thereby rotationally locking the two together. A spring (which may be a coil spring) is represented by 40c, and is disposed between main shaft 30 and trailer 20 (for example, coiled around hinge pin 40a) and biases main shaft 30 toward its second, substantially vertical position. Spring 40c can be of a strength such that little additional force is required to raise main shaft 30 to its vertical position.

In the preferred embodiment, main shaft 30 is of a telescopic configuration, and comprises telescoping first and second shafts 30a and 30b. FIG. 7 is a partial cross section of one possible embodiment of the telescopic feature, using a gear and lead screw arrangement. Referring to FIG. 7, first shaft 30a is proximal trailer 20, and telescopes into a bore in second shaft 30b. A nut 34 is disposed atop first shaft 30a. A lead screw 33 (commonly referred to as an "Acme" screw) is threaded through nut 34, extends upwardly through a bearing 34 fixed in second shaft 30b, and is attached to a bevel gear 32 which rotates atop bearing 34. A second bevel gear 31 is mounted within second shaft 30b on driven shaft 37, which is in turn driven by the user by handle 35 (which may be detachable). To telescope main shaft 30 upwardly or downwardly, a user simply attaches handle 35 to driven shaft 37, and rotates handle 35 in the desired direction. That action rotates bevel gear 31, which in turn rotates bevel gear 32 and lead screw 33. Rotation of lead screw 33 within nut 34 forces lead screw and the entire assembly above it—that is, the gears, bearing 36, second shaft 30b, and ultimately platform 60—up or down as the case may be.

The present invention also comprises a safety lock, denoted by element 200, to positively lock first and second shafts 30a and 30b together at a desired position. Once main shaft (via first and second shafts 30a and 30b) are telescoped to a desired length, holes in first and second shafts 30a and 30b can be aligned one with the other, and safety lock 200 (which comprises a spring loaded pin) can be inserted through the aligned holes, thereby locking the shafts together. That way, safety lock 200 acts as a backup mechanism to the bevel gear and lead screw mechanism for maintaining the shaft in an extended position. As shown in FIG. 7, safety lock 200 comprises a spring loaded pin extending through shaft 30b, and through holes in shaft 30a, to lock the two together.

A typical sequence of use of the stand is as follows. Starting with an ATV loaded atop trailer 20, as seen in FIG. 6, tow vehicle 130 pulls stand 10 and ATV 140 to a general hunting locality. ATV 140 is then unloaded from trailer 20 with ramps or other suitable means. Stand 10 can then be disconnected from tow vehicle 130 and attached to ATV

140, which can then pull stand 10 to a specific desired hunting location. Once on site, if desired, stand 10 can remain hitched to ATV 140; otherwise, it can be unhitched, and jack 171 used to support front end 20*a* of trailer 20. Main shaft 30 is then raised (assisted by the bias of spring 40*c*) to its second, substantially upright position, as seen in FIGS. 2 and 3, and locked in place. Next, platform 60 can be rotated to a position wherein base 70 is substantially perpendicular to main shaft 30, and locked in place. Then, main shaft 30 can be telescoped to its maximum extension. Stabilizer arms 170 can be installed to provide additional support with the ground, and brace 180 installed to create a more rigid connection between main shaft 30 and trailer 20. Access ladder 110 is then deployed to enable access to platform 60. From the first step of rotating the main shaft to its vertical position, until the stand is fully and completely erected, a total time of perhaps 15 minutes is required.

With regard to materials and dimensions, most of the structural pieces of the invention lend themselves to fabrication from tubular or angle steel, including galvanized steel, as desired. Of course, other metals such as aluminum may also be used. Certain components, for example base 70, could advantageously be made of high-strength composites. It is to be understood that the scope of the invention comprises fabrication from any suitable materials, and the suggestions given herein are by way of example only. Dimensions of the various components of the stand are a matter of choice and application to the particular setting. By way of example, main shaft may be comprised of two telescoping shafts, the lower one about 4 feet long and the upper one about 5 feet long. Such dimensions permit a telescoped shaft length of about 8½' from the trailer bed to the base of the platform. Yet another dimensional aspect is that in the preferred embodiment, the maximum width of trailer 20 is less than the maximum width of ATV 140. Therefore, the user is ensured that trailer 20 may be pulled through any opening through which ATV 140 will pass.

While the above description contains many specificities, it is to be understood that they are by way of example only and not by way of limitation. A number of changes could be made without departing from the spirit of the invention. For example, different materials could be used; the shapes of different components, for example platform base 70 could be square, rectangular, or circular; additions could be made to trailer 20 such as tool boxes or the like; different types of locking mechanisms could be employed on the hinges; and so on.

Therefore, the scope of the invention should be determined by the appended claims and their legal equivalents, rather than by the examples given.

I claim:

1. A trailer mounted, foldable elevated stand, comprising:
   a) a wheeled trailer adapted for towing by a tow vehicle;
   b) a telescoping main shaft comprising a plurality of telescoping shafts, said main shaft having a first and a second end, said main shaft hingedly mounted by said first end to said wheeled trailer, and a lock to permit locking said main shaft in a substantially vertical position;
   c) a bevel gear and lead screw mechanism interconnecting at least two of said plurality of telescoping shafts, for telescoping said at least two shafts one to the other;
   d) a spring biasing said main shaft toward said substantially vertical position; and
   e) a platform having a base, hingedly fixed to said second end of said main shaft, and a lock to permit locking said base in a substantially horizontal position when said main shaft is in a substantially vertical position.

2. The stand of claim 1, wherein said platform further comprises a seat and a safety rail around at least part of a circumference of said base.

3. The stand of claim 2, further comprising an access ladder depending downwardly from said platform.

4. The stand of claim 3, further comprising a plurality of support legs attached to said stand and extending downward to a ground footing.

5. The stand of claim 4, further comprising a brace extending between said main shaft and said trailer.

6. The stand of claim 5, wherein:
   a) said trailer has a front end proximal to a tow vehicle connection and an opposite rear end;
   b) said main shaft hinge mounting is disposed on said trailer closer to said rear end than said front end, so that when said main shaft is in a folded down position said platform is proximal said front end of said trailer, thereby permitting loading of a wheeled vehicle on said trailer; and
   c) further comprising surfaces on said trailer to permit a wheeled vehicle to be loaded onto and carried on said trailer.

7. A trailer mounted, foldable elevated hunting stand, comprising:
   a) a wheeled trailer adapted for towing by a tow vehicle, said trailer having a front end proximal said tow vehicle and an opposite rear end, said trailer further having an upper surface adapted for carrying a wheeled vehicle thereon;
   b) a main shaft comprising telescoping first and second shafts and having a first and a second end, said first end of said main shaft mounted by a hinge to said wheeled trailer, and further comprising a bevel gear and lead screw mechanism disposed between said first and second shafts for telescoping said first and second shafts one to the other, said main shaft rotatable between a first folded down position and a second substantially vertical position, and a lock to permit locking said main shaft in said substantially vertical position;
   c) a spring mounted between said trailer and said main shaft and biasing said main shaft toward said second position;
   d) a brace extending between said main shaft and said trailer;
   e) a platform hingedly fixed to said second end of said main shaft, and a lock to permit locking said platform in a substantially horizontal position when said main shaft is in said second position; and
   f) an access ladder attached to said platform.

8. The stand of claim 7, wherein said platform comprises a base, a seat, and a safety rail around at least part of a circumference of said base.

9. The stand of claim 7, further comprising a plurality of support legs attached to said stand and extending downward to a ground footing.

10. The stand of claim 9, wherein:
    said hinge mounting said main shaft on said trailer is disposed on said trailer closer to said rear end than said front end, so that said main shaft folds to said first position in a direction toward said front end and when said main shaft is in said first position said platform is closer to said front end of said trailer than said rear end of said trailer.

* * * * *